No. 755,710. Patented March 29, 1904.

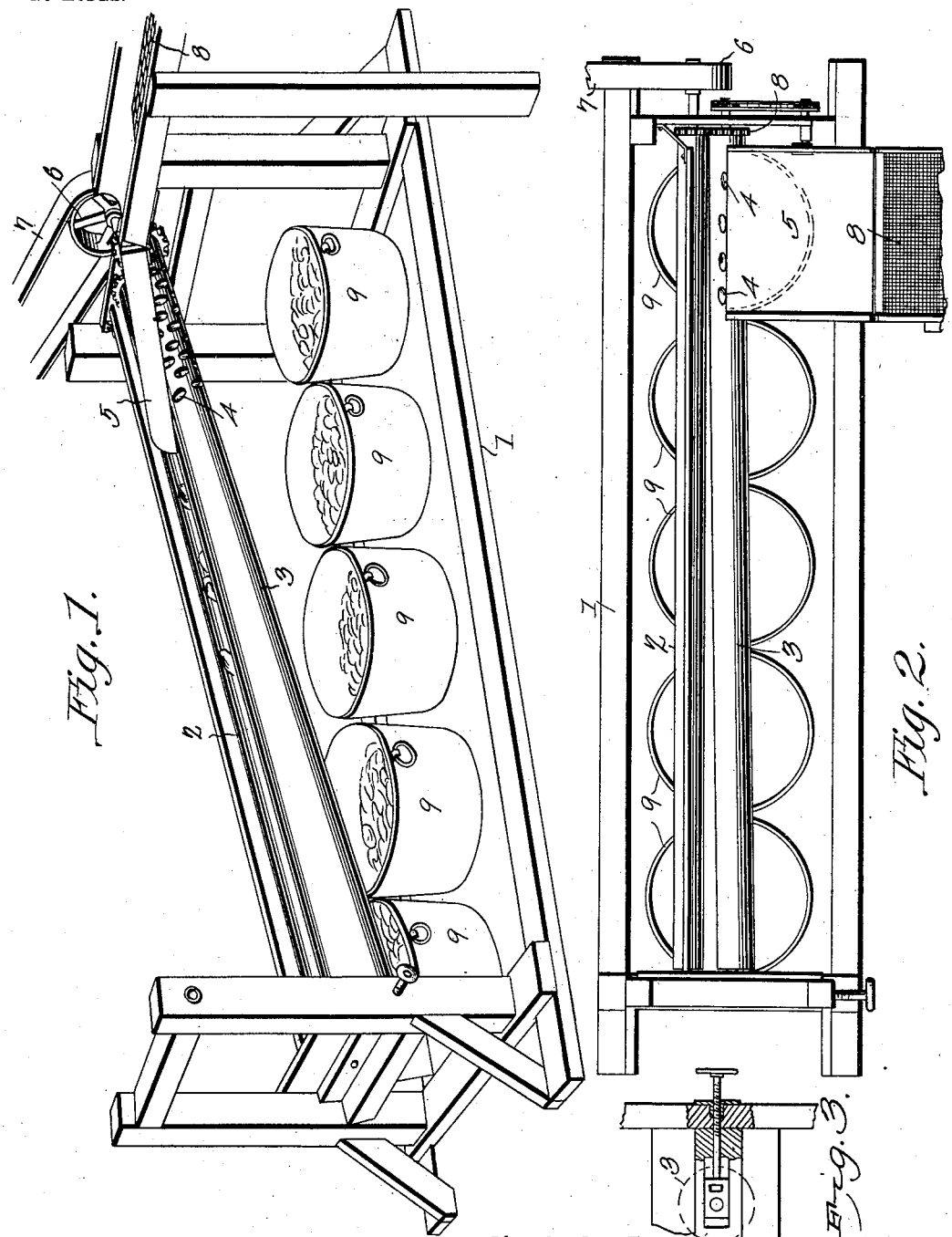

UNITED STATES PATENT OFFICE.

GARRETT W. SCHREURS, OF MUSCATINE, IOWA.

SHELL GRADER AND SEPARATOR.

SPECIFICATION forming part of Letters Patent No. 755,710, dated March 29, 1904.

Application filed February 28, 1903. Serial No. 145,600. (No model.)

*To all whom it may concern:*

Be it known that I, GARRETT W. SCHREURS, a citizen of the United States, residing at Muscatine, in the county of Muscatine and State of Iowa, have invented a new and useful Shell Grader and Separator, of which the following is a specification.

At the present day it is the practice in button-factories to grade and separate by hand the shells from which pearl-button blanks are cut, the work when performed in this manner being of necessity slow and tedious and entailing considerable expense.

The present invention has for its objects to produce a device for performing this work which will be simple of construction, inexpensive to erect, efficient in operation, and one which will in practice rapidly and thoroughly grade the shells according to size and deliver them in this separated state into a series of suitable receptacles.

The invention comprises the details of construction and combination of parts more fully hereinafter described.

In the accompanying drawings, Figure 1 is a perspective view of my improved device. Fig. 2 is a top plan view of the same. Fig. 3 is a detailed view showing the means for adjusting the rollers.

Referring to the drawings, 1 indicates a suitable framework having journaled therein at an inclination a pair of rollers 2 and 3, preferably of unequal diameters, though they may be of equal diameters, as hereinafter explained. Roller 3 is provided near its upper end with a series of spirally-arranged depressions 4, which lie beneath the delivery end of a chute or table 5, which receives the shells *en masse* and delivers them to the upper ends of the rollers. The table, which is preferably provided with a bottom of interstitial material, is vibrated in any suitable manner—such, for example, as by a cam carried by the roller—whereby the shells will be delivered in a partially-separated condition to the rollers and the shell fragments and other refuse will be sifted through the perforated bottom, thus cleaning the shells before their passage to the rollers.

One of the rollers is provided at its upper end with a drive-pulley 6, connected by a belt 7 with any suitable source of power, the rollers being connected one with the other by suitable intermeshing gears 8 and are rotated in opposite directions, the direction of rotation being such that their upper faces will travel away from each other.

The rollers, which diverge from their upper toward their lower ends throughout their entire length, have located beneath them a series of suitable receptacles 9 to receive the separated shells which are delivered between the rollers, and one of the rollers is mounted in movable bearings, whereby the space between the rollers may be varied or adjusted according to the class of shells being graded.

The operation of the device is as follows: The shells are delivered to the rollers from the vibratory table in a clean and partially-separated condition, as above described, and as they fall upon the rollers are, through the action of the spiral depressions in the surface of the larger roller and the difference in speed of the rollers due to their difference in size, turned to a position with their edge downward, which position it is necessary for the shells to assume in order to be properly separated according to sizes. In this position the shells travel rapidly downward upon the rollers, and owing to the gradual widening of the space between the latter will drop downward between them into the underlying receptacles, the shells of one size falling into one receptacle, those of another size into the next receptacle, and so on, as will be readily understood.

From the foregoing description it will be seen that I produce a device which is at once simple of construction, efficient in operation, and one by which the work of separating and grading the shells according to size will be properly performed, and in attaining these ends I do not limit or confine myself to the precise details herein shown and described, inasmuch as minor changes may be made therein without departing from the spirit or scope of the invention. For example, the rollers are made of different sizes in order to obtain the differential speed necessary for properly turning the shells; but it is to be understood that this result may be attained by a pair of rollers of equal diameters and driven at a different relative speed.

Having thus described my invention, what I claim is—

1. In a device of the class described, the combination with a suitable framework, of a pair of rollers of unequal diameters mounted at an inclination therein, said rollers diverging uniformly throughout their entire length from their upper to their lower ends and the larger roller having a series of depressions at its upper receiving end, means for rotating the rollers in opposite directions, and means for delivering shells to the rollers.

2. In a device of the class described, the combination with a suitable framework, of a pair of rollers of unequal diameters mounted at an inclination therein, said rollers diverging uniformly throughout their entire length from their upper to their lower ends and the larger roller having a series of depressions provided at its upper receiving end, means for rotating the rollers in opposite directions, and a vibratory table for delivering shells in a partially-separated condition to the rollers.

3. In a device of the class described, the combination with a suitable framework, of a pair of rollers of unequal diameters mounted at an inclination therein, said rollers diverging uniformly throughout their entire length from their upper to their lower ends and the larger roller having a series of depressions provided at its upper receiving end, means for rotating the rollers in opposite directions, a vibratory table for delivering shells in a partially-separated condition to the rollers, and mechanism operable by one of the rollers for vibrating the table.

In testimony that I claim the foregoing as my own I have hereto affixed my signature in the presence of two witnesses.

GARRETT W. SCHREURS.

Witnesses:
J. B. MARK,
W. S. PEASLEY.